(12) United States Patent
Dunn et al.

(10) Patent No.: US 11,378,689 B2
(45) Date of Patent: Jul. 5, 2022

(54) HIGHLY MULTIPLEXED COHERENT LIDAR SYSTEM

(71) Applicant: Analog Devices, Inc., Norwood, MA (US)

(72) Inventors: Tyler Adam Dunn, North Reading, MA (US); Andrew William Sparks, Arlington, MA (US); Michael Ziemkiewicz, Boulder, CO (US); Miles R. Bennett, Stanford, CA (US)

(73) Assignee: Analog Devices, Inc., Norwood, MA (US)

(*) Notice: Subject to any disclaimer, the term of this patent is extended or adjusted under 35 U.S.C. 154(b) by 170 days.

(21) Appl. No.: 16/793,505

(22) Filed: Feb. 18, 2020

(65) Prior Publication Data
US 2021/0255324 A1 Aug. 19, 2021

(51) Int. Cl.
| | | |
|---|---|---|
| *G01C 3/08* | (2006.01) | |
| *G01S 17/34* | (2020.01) | |
| *G01S 7/4914* | (2020.01) | |
| *G01S 7/4911* | (2020.01) | |

(52) U.S. Cl.
CPC ............. *G01S 17/34* (2020.01); *G01S 7/4911* (2013.01); *G01S 7/4914* (2013.01)

(58) Field of Classification Search
None
See application file for complete search history.

(56) References Cited

U.S. PATENT DOCUMENTS

| | | | |
|---|---|---|---|
| 7,532,311 B2 | 5/2009 | Henderson et al. | |
| 8,089,617 B2 | 1/2012 | Fluckiger | |
| 2013/0208256 A1 | 8/2013 | Mamidipudi et al. | |
| 2014/0376001 A1 | 12/2014 | Swanson | |
| 2017/0328988 A1* | 11/2017 | Magee | G01S 7/484 |
| 2017/0329011 A1 | 11/2017 | Warke et al. | |
| 2018/0306925 A1 | 10/2018 | Hosseini et al. | |
| 2019/0025408 A1 | 1/2019 | Hwang et al. | |
| 2019/0025426 A1 | 1/2019 | Satyan et al. | |

(Continued)

FOREIGN PATENT DOCUMENTS

| | | | | |
|---|---|---|---|---|
| FR | 3099587 A1 * | 2/2021 | ........... | G01S 7/4913 |
| WO | WO-2018160729 A2 | 9/2018 | | |
| WO | WO-2019014596 A1 | 1/2019 | | |

OTHER PUBLICATIONS

Aflatouni, Firooz, et al., "Nanophotonic coherent imager", Optics Express, 23(4), 5117-5125, (2015), 9 pgs.

(Continued)

*Primary Examiner* — Mark Hellner
(74) *Attorney, Agent, or Firm* — Schwegman Lundberg & Woessner, P.A.

(57) ABSTRACT

A light detection and ranging (LIDAR) system comprises a laser diode; a laser diode driver circuit configured generate a laser beam using the laser diode and to frequency chirp the generated laser beam according to a frequency chirp period; a laser splitter to split the generated laser beam into N transmit laser beams pointed at different angles, wherein N is an integer greater than one, and a frequency chirp period of each of the N transmit laser beams is the frequency chirp period of the generated laser beam; and multiple return beam paths to receive N return beams and determine time of flight values for the N return beams in parallel.

22 Claims, 11 Drawing Sheets

(56) References Cited

U.S. PATENT DOCUMENTS

2019/0064357 A1    2/2019  Montoya et al.
2019/0339389 A1   11/2019  Russo et al.
2020/0142066 A1*   5/2020  Sandborn .............. G01S 7/4817
2021/0063541 A1*   3/2021  Zheng ................... G01S 7/4911

OTHER PUBLICATIONS

Kim, Taehwan, "Realization of Integrated Coherent LIDAR", PhD Dissertation, UC Berkeley, (2019), 132 pgs.
Lopez, Joshue, et al., "Planar-lens Enables Beam Steering for Chip-scale LIDAR", IEEE Conference on Lasers and Electro-Optics (CLEO), (2018), 2 pgs.

* cited by examiner

HIGHLY MULTIPLEXED COHERENT LIDAR SYSTEM

FIELD OF THE DISCLOSURE

This document relates generally to Laser Imaging Detection and Ranging (LIDAR) systems.

BACKGROUND

A LIDAR system can be used for machine vision, and also for vehicle navigation. LIDAR systems may include a transmit channel that can include a laser source to transmit a laser signal, and one or more receive channels that include a photo-detector to detect a reflected laser signal. For applications such as vehicle navigation it is desirable for the LIDAR system to detect objects at distance. Typically, the power of the transmit channel is increased to improve the detection distance. As it becomes desirable to process a field of view to obtain image data at greater distances, a conventional LIDAR system can consume a lot of power.

SUMMARY OF THE DISCLOSURE

This document relates generally to LIDAR systems and methods of their operation. A LIDAR system according to various aspects includes a laser diode; a laser diode driver circuit configured to generate a laser beam using the laser diode and to frequency chirp the generated laser beam according to a frequency chirp period; a laser splitter to split the generated laser beam into N transmit laser beams pointed at different angles, wherein N is an integer greater than one, and a frequency chirp period of each of the N transmit laser beams is the frequency chirp period of the generated laser beam; and multiple return beam paths to receive N return beams and determine time of flight values for the N return beams in parallel.

A method of operating a LIDAR system according to various aspects includes generating a laser beam and frequency chirping the generated laser beam using a frequency chirp period; splitting the generated laser beam into N transmit laser beams pointed at multiple different angles, wherein a chirp period of each of the N transmit laser beams is the frequency chirp period of the generated laser beam; receiving N return beams at the LIDAR system; and determining multiple time of flight values in parallel using the N return beams.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
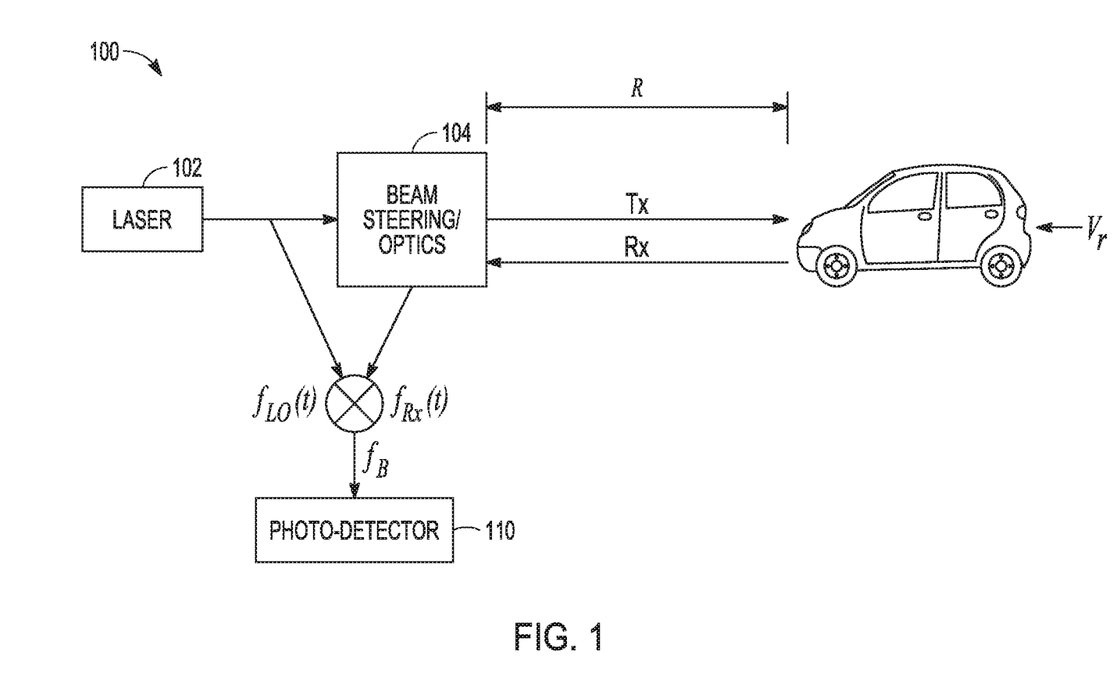
FIG. 1 is a block diagram of portions of an example of a Laser Imaging Detection and Ranging (LIDAR) system.

FIG. 1 is a block diagram of portions of an example of a Laser Imaging Detection and Ranging (LIDAR) system 100. The system includes a laser source 102 and a laser beam steering mechanism 104 to direct the transmitted (Tx) laser beam. The transmitted laser beam is reflected by an object and the reflected beam is received (Rx) by the LIDAR system. The received reflected beam is detected using a photo-detector 110 and the received beam is used to measure the distance of the object.

For vehicle navigation it is desirable for the LIDAR system to detect objects at long-range. An approach for long-range measurement is coherent frequency modulated continuous wave (FMCW) LIDAR. In coherent FMCW LIDAR, the frequency of the transmitted laser beam is chirped linearly over a bandwidth B with a starting frequency $f_0$ over a chirp period T. A local oscillator (LO) signal with frequency $f_{LO}$ is derived from the laser beam emitted from the laser diode, where $$f_{LO}(t) = f_0 + \frac{Bt}{T}$$

A mixer is used to optically interfere with the received beam $f_{Rx}(t)$ to generate a signal with a beat frequency $f_B$. The beat frequency signal is used to determine time of flight $\tau_{TOF}$ and hence the range R to the object, where $$\tau_{TOF} = \frac{2R}{c}$$

in which c is the speed of light and R is the range to the object.

Figure 2:
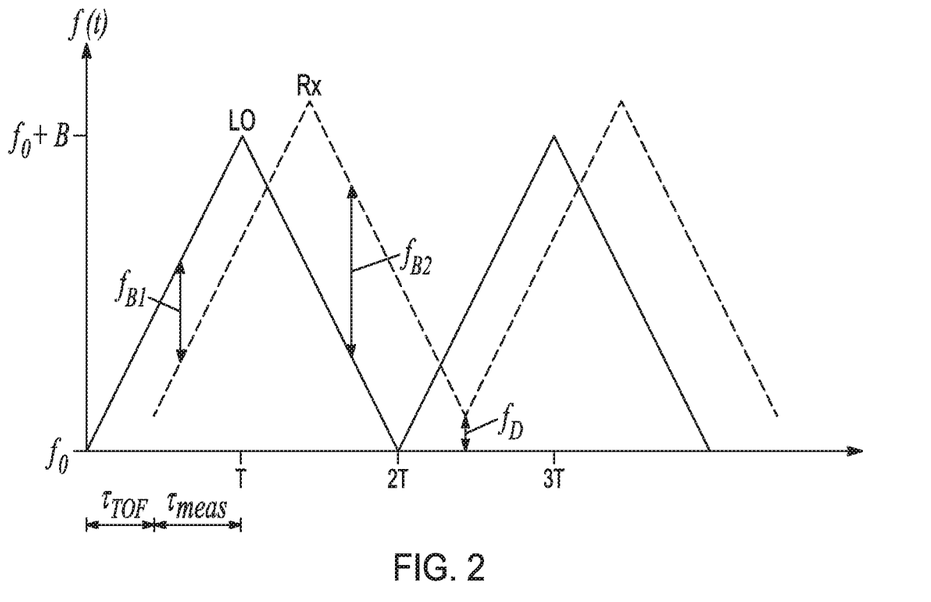
FIG. 2 is a graph illustrating frequency modulated continuous wave (FMCW) LIDAR.

FIG. 2 is a graph illustrating concepts of FMCW LIDAR. As shown in FIG. 2, the frequency of the transmitted laser beam can be chirped up and down in frequency to generate signals with beat frequencies $f_{B1}$ and $f_{B2}$, where $f_{B1}$ is the beat frequency determined during the upward frequency chirp and $f_{B2}$ is the beat frequency determined during the downward frequency chirp. The two beat frequencies can be used to determine relative velocity r of the object from the Doppler shift of $f_D$ of the received laser beam using $$f_{B1} = \frac{B\tau_{TOF}}{T} - f_D$$

$$f_{B2} = \frac{B\tau_{TOF}}{T} + f_D$$

$$f_D = \frac{2v_r}{\lambda_0}$$

$$R = \frac{cT(f_{B1} + f_{B2})}{4B}$$

$$v_R = \frac{\lambda_0(f_{B2} - f_{B1})}{4}$$

where $\lambda o$ is the nominal laser wavelength and relative velocity $v_r$ that is positive in the direction toward the LIDAR system.

Resolution in measurements of object range and velocity can be calculated by considering a Fourier transform which could be used to measure the beat frequencies with resolution $\Delta f_B = 1/T$. With $v_r = 0$ $$f_B = \frac{2BR}{cT} \rightarrow \Delta f_B = \frac{2B\Delta R}{cT} = \frac{1}{T}$$

and with R=0

$$f_B = \frac{2v_r}{\lambda_0} \rightarrow \Delta f_B = \frac{2\Delta v_r}{\lambda_0} = \frac{1}{T}$$

The range resolution $\Delta R$ and velocity resolution $\Delta v_r$ are therefore set by the chirp bandwidth B, chirp period T and nominal wavelength $\lambda o$ as $$\Delta R = \frac{c}{2B} \text{ and } \Delta v_r = \frac{\lambda_0}{2T}.$$

It should be noted that the electronics of the receive channel (e.g., a photo diode (PD) and transimpedance amplifier (TIA)) need to have a bandwidth greater $$\frac{B * \tau_{TOF,max}}{T} + f_{D,max}$$

for a maximum flight time $\tau_{TOF,MAX}$ of $$\tau_{TOF,max}\left( = \frac{2R_{max}}{c}\right),$$

and maximum Doppler shift $f_{D,MAX}$ of $$f_{D,max}\left( = \frac{2v_{r,max}}{\lambda_0}\right)$$

that are of interest in the measurement. Also, by the Nyquist Theorem, the analog-to-digital converter (ADC) of the receive channel should have a sampling rate greater than two times this maximum bandwidth, or greater than $$2 * \left(\frac{B * \tau_{TOF,max}}{T} + f_{D,max}\right)$$

to measure the beat frequencies over the entire range.

Coherent detection FMCW LIDAR systems offer significant advantages over those based on incoherent detection, including shot noise limited detection, higher immunity to interference, improved measurement of velocity, and lack of requirement for short, high-power laser pulses to achieve long range. However, the coherent FMCW LIDAR systems pose significant challenges to achieving high frame rate in long-range scanning systems.

With sufficient local oscillator power to make shot noise dominant, the system signal-to-noise ratio (SNR) is $$SNR = \frac{\gamma P_t D^2 \tau_{meas}}{hf_0 R^2}$$

for transmitted power $P_t$, receive aperture diameter D, Planck's constant h and measurement time $\tau_{meas}$. Atmospheric absorption, de-polarization, photodetector quantum efficiency, relative (Tx vs. Rx) aperture size, and the degree of spatial and temporal coherence between LO/Rx are factored into the constant of proportionality $\gamma$.

For a chirp period T, the measurement time $\tau_{MEAS}$ available to get useable data is $T-\tau_{TOF}$. For a LIDAR system that scans the transmit and receive channel in a field of view, for each spot to be measured, the laser beam scanner must ideally dwell for a time $\tau_{TOF}+\tau_{meas}$ at the same angle in order to measure sufficient SNR while ensuring maximal spatial coherence between the LO and Rx laser signal during $\tau_{meas}$. For an example LIDAR system with a 200 meter range, $\tau_{TOF,max}=1.33$ microseconds (1.33 us) and the time for measurement $\tau_{meas}$ may range between 0.1 us and 100 us, or $0.1 \text{ us} < \tau_{meas} < 100 \text{ us}$.

After the dwell time, the laser beam scanner must then, as quickly as possible, transition to the next angle to be measured. Scanning LIDAR systems are limited (e.g., mechanically, thermally, etc.) in how quickly they do this. For these reasons, achieving the frame rates desired in many applications (e.g., 20-30 Hz) with high resolution is very challenging. For example, for a 200 m system with $\tau_{meas}=1$ us and 200×100 points measured with both up and down frequency chirping, the maximum possible frame rate is only 10.7 Hz. This is short of the 20-30 Hz desired frame rate, and resolution considerably higher than 200×100 points is desired in many applications.

In conventional approaches, to minimize dwell time necessary for high SNR, emphasis is often placed on maximizing one or both of transmit power $P_t$ and aperture size D according to the expression for SNR presented previously herein.

An approach that allows one or both of the frame rate to be increased and the SNR to be increased is to split the transmit power of a single transmit laser signal or multiple signals into multiple independent channels pointed at different angles, but also increase the frequency chirp period T by some factor. Among other things, this would allow the non-measurement time $\tau_{TOF}$, or dead time, to be minimized as a fraction of the overall dwell time.

Figure 3:
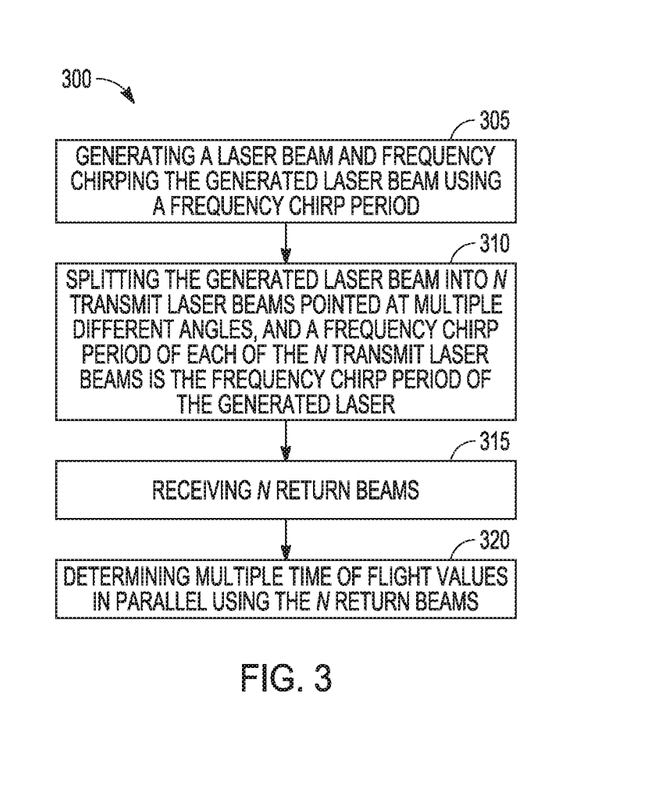
FIG. 3 is a flow diagram of an example of a method of operating a LIDAR system.

FIG. 3 is a flow diagram of an example of a method 300 of operating a LIDAR system. At 305, a laser beam is generated, and the generated laser beam is frequency chirped using a frequency chirp period T.

At 310, the generated laser beam is split into N transmit laser beams pointed at multiple different angles, wherein N is an integer greater than one (e.g., 2≤N≤100). However, the frequency chirp period T is increased over the approach where a single laser beam is scanned to multiple positions without the splitting.

Figure 4A:
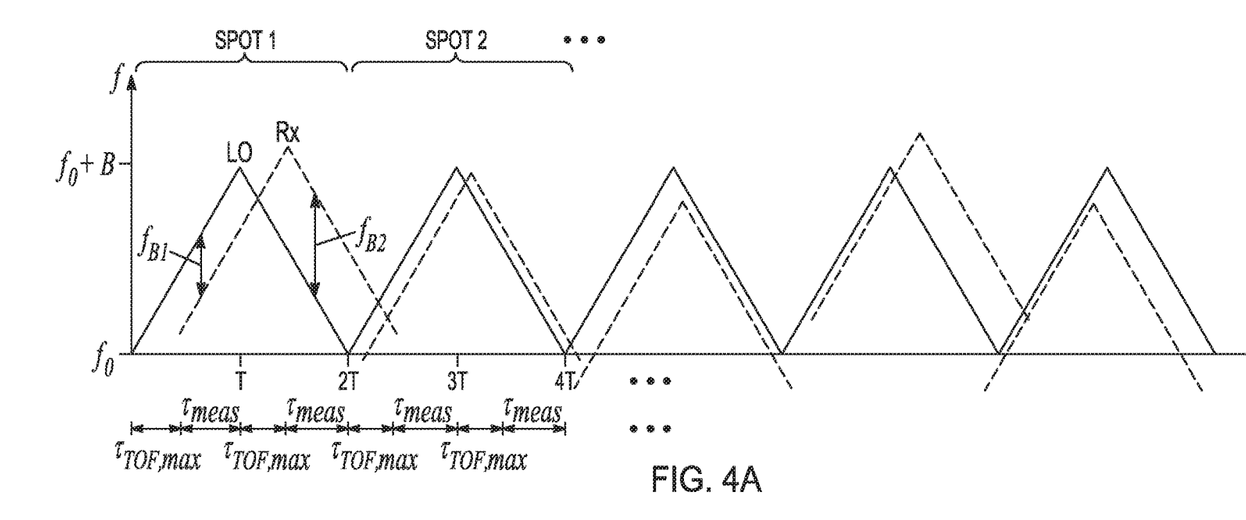
FIGS. 4A-4B are illustrations of the scanning approach to LIDAR and the beam splitting approach to LIDAR.
Figure 4B:
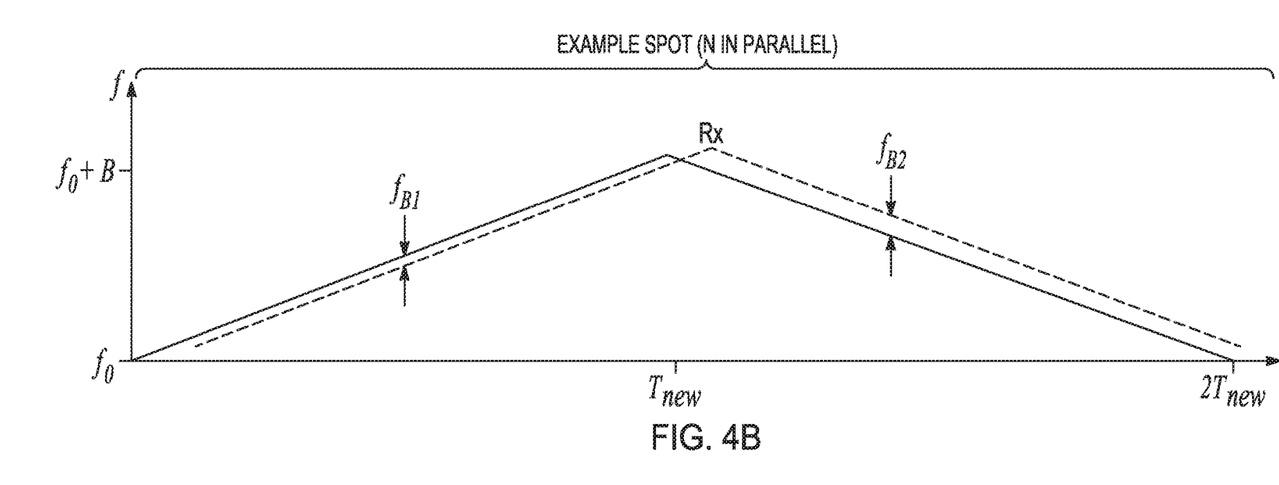

FIGS. 4A-4B are illustrations of the scanned approach and the beam splitting approach. FIG. 4A shows the conventional scanned approach where a laser channel is scanned to multiple positions to obtain a measurement for each position. Measurements for each position (spot 1, spot 2, etc.) are obtained in series. Each position uses frequency chirp period T in the transmit beam, and a return beam is received for each position of the scan. In FIG. 4B, the transmitted laser beam is split into multiple beams.

In FIG. 4A, the original generated laser beam is split into N beams (N being an integer greater than one). FIG. 4B shows that the N beams are transmitted at the same time in parallel rather than serially. However, in the bottom graph the frequency chirp period $T_{new}$ of the split laser beam is expanded. The frequency chirp period can be set in the original laser beam before the splitting and the frequency chirp period of each of the split laser beams has the chirp period of the original laser beam. The frequency chirp period $T_{new}$ in FIG. 4B may be the frequency chirp period T in FIG. 4A expanded by some factor. For example, $T_{new}$ may be C·T where C is a constant. In some aspects, $T_{new}$ FIG. 4B is determined according to the number of beams N. In some aspects, the frequency chirp period $T_{new}$ is T expanded by the factor C up to the bandwidth B with $T_{new}$=C·T, with C≤N.

Returning to FIG. 3 at 315, N return beams are received by the LIDAR system. The N return beams are processed in parallel, and at 320 multiple time of flight values are determined in parallel for the N return beams.

Figure 5:
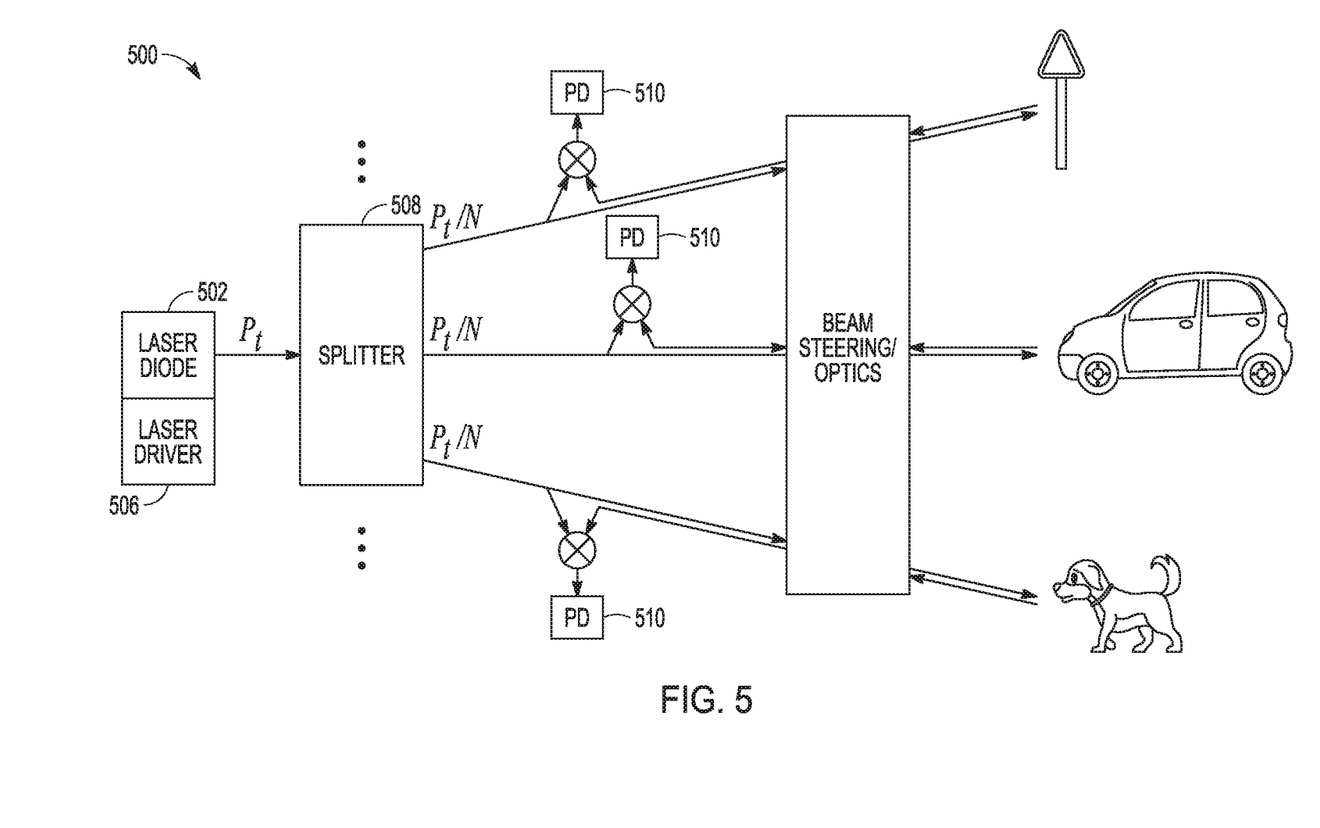
FIG. 5 is a block diagram of portions of another example of a LIDAR system.

FIG. 5 is a block diagram of portions of another example of a LIDAR system 500. The system may perform the method described in regard to FIG. 3. The system includes a laser source. The laser source can include a laser diode 502 and a laser diode driver circuit 506. The laser diode driver circuit 506 drives the laser diode 502 to generate a laser beam and to frequency chirp the generated laser beam according to a frequency chirp period (e.g., according to the frequency chirp period $T_{new}$ in FIG. 4B).

The system also includes a laser splitter 508 to split the generated laser beam into multiple transmit laser beams pointed at different angles. In the example of FIG. 5, the laser is split into three transmit laser beams (N=3), but N may be 2≤N≤100. The frequency chirp period of each of the N transmit laser beams is $T_{new}$ the frequency chirp period of the generated laser beam. The LIDAR system includes multiple return beam paths to receive N return beams. In the example of FIG. 5, each return beam path includes a photodiode 510 (PD).

Figure 6:
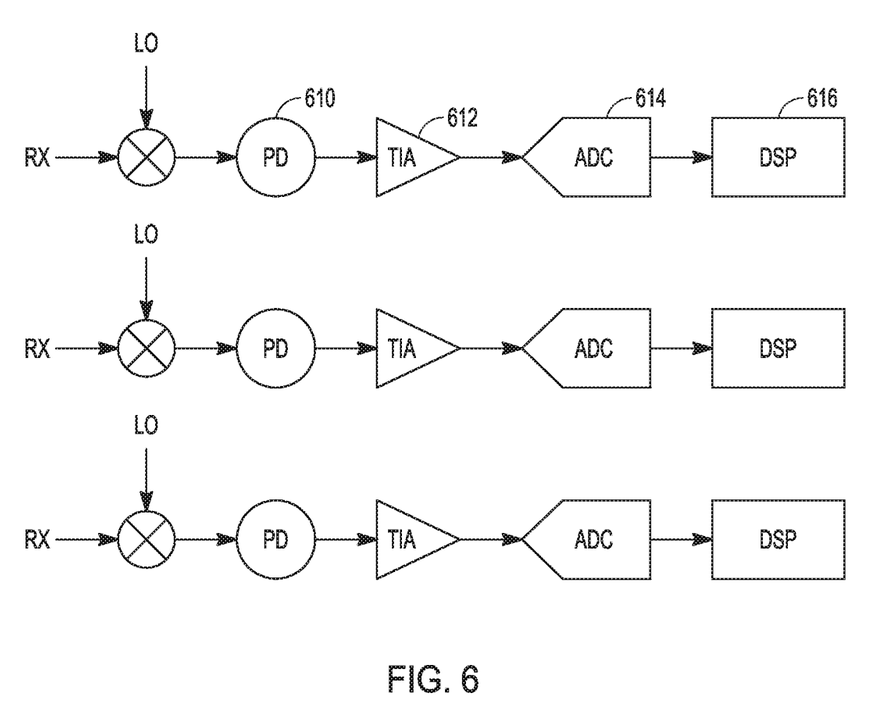
FIG. 6 is a block diagram of an example of an electronic implementation of three return beam paths.

FIG. 6 is a block diagram of an example of an electronic implementation of three return beam paths. Each return beam path includes a photodiode 610 (PD), a transimpedance amplifier 612 (TIA), an analog-to-digital converter 614 (ADC), and a digital signal processor 616 (DSP). It should be noted that because of the increase in frequency chirp period, the electronics of the receive channels can be rated to a lower bandwidth and sampling rate than the electronics used in the scanning approach. Additionally, although a separate DSP is shown for each return beam path, a reduced number of DSPs (e.g., one DSP) may be used to process information from the ADCs of the return beam paths. The processing circuitry determines time of flight values in parallel for the N return beams. In some aspects, the processing circuitry calculates one or both of a range (R) and relative radial velocity ($v_r$) for each of the N return beams in parallel.

FIG. 6 is one example of a circuit architecture for the return beam paths. Other architectures can be used for the return beam paths. In some aspects, each return beam path can be included in a beam channel. Each beam channel can include a return beam path and a transmit beam path, e.g., N beam channels include N transmit beam paths and N return beam paths. There are several options for an optical implementation of a beam channel.

Figure 7:
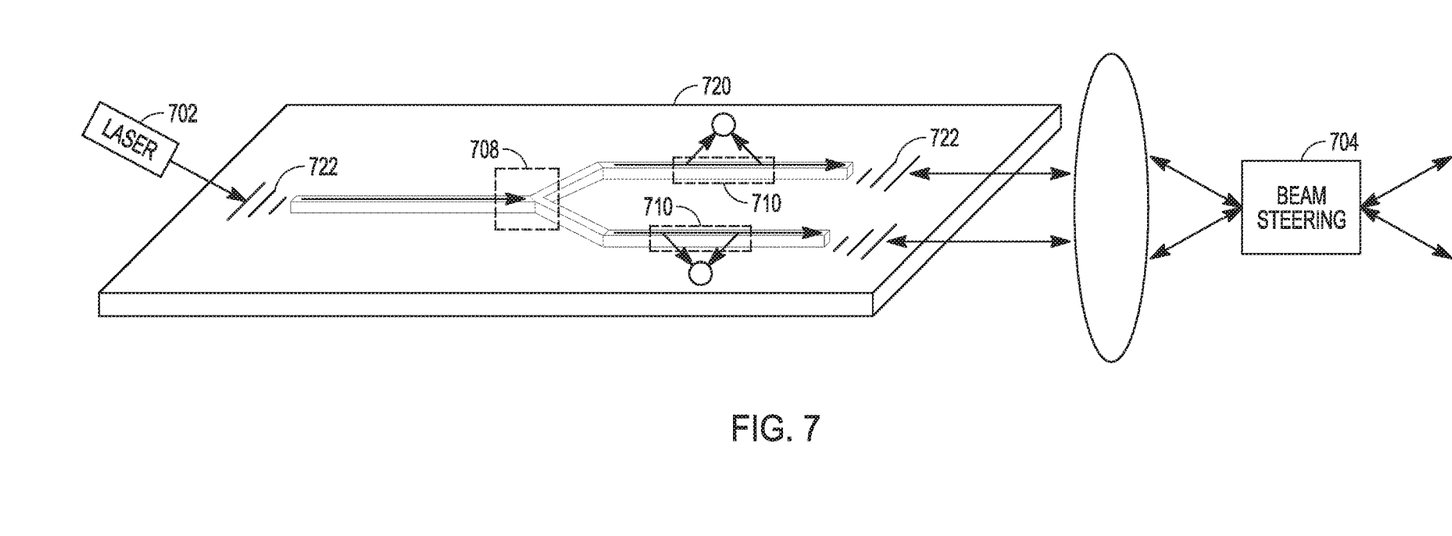
FIGS. 7-9 are diagrams of portions of examples of beam channels.

FIG. 7 is a diagram of portions of an example of a beam channel included in a photonic integrated circuit 720 (PIC). The PIC includes a coupler 722, such as a grating or edge coupler, which couples the laser beam from a laser source 702 onto the PIC. The PIC includes a laser splitter 708 that passively splits the lasers into N beam channels. Only two beam channels are shown in the example of FIG. 7 to simplify the diagram. As pictured, each beam channel splits once further, using a portion of light as a local oscillator which illuminates the photodiode 710 in that channel and the remainder of the light as a transmit laser beam, which is directed to the scene at a different angle for every channel. The beam channel of FIG. 7 may also include a beam steering element 704 to provide additional scanning of the N transmit laser beams. Some examples of a beam steering element include a microelectromechanical system (MEMS) mirror, spinner, optical phased array (OPA), liquid crystal waveguide, polarization grating, etc. Each beam channel also includes a return beam path that include an integrated photodiode 710 to receive the return laser beam. The return beam paths can also include directional couplers or circulators. It is worth noting that the splitting can be implemented differently than depicted in FIG. 7 in order to accomplish the same result. For instance, rather than splitting the local oscillator light from each channel individually, it can be split from the main beam prior to splitter 708 and directed to each photodiode 710 separately from the transmit beam paths.

Figure 8:
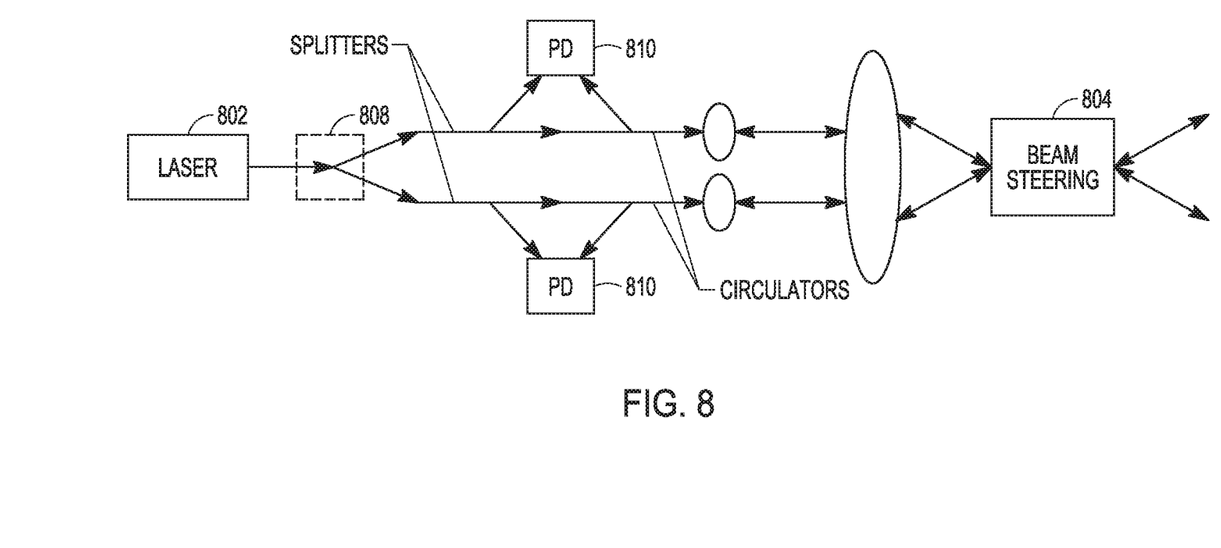

FIG. 8 is a diagram of portions of another example of a beam channel. The laser beam from the laser source 802 is coupled onto one or more optical fibers. The laser splitter includes one or more optical fiber splitters 808 that split the generated fiber-coupled laser beam into N transmit laser beams of N beam channels. Each beam channel again includes a photodiode 810 to receive a return laser beam and may include a directional coupler or circulator. The beam channel may also include a beam steering mechanism 804.

Figure 9:
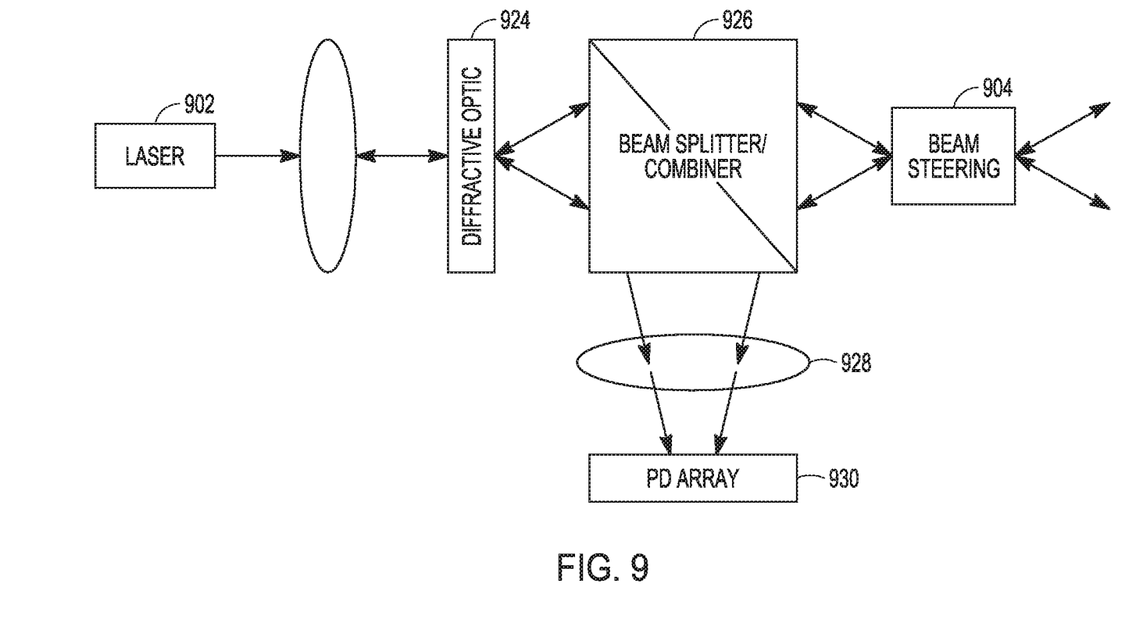

FIG. 9 is a diagram of portions of another example of a beam channel. One or more free-space optics are used to split the laser beam generated by the laser beam source 902. In the example shown, the laser splitter includes a diffractive optical element 924 that splits the generated laser beam into the N transmit laser beams of the N beam channels. The beam channel may include a beam splitter/combiner 926. The beam channel may include a lens 928 that directs a returned beam onto an array of photodiodes. The photodiode array 930 may include N photodiodes, one for each returned beam. The beam channel may also include a beam steering mechanism 904.

Each of the implementations of FIGS. 7-9 could be employed in a bistatic or monostatic configuration. In a bistatic configuration, the receive beam path may have a separation from the transmit beam path so that there is a bistatic angle between the transmit beam and the received beam. In a monostatic configuration, the transmit path and the receive path are at the same or nearly the same location, so that the angle between the transmit beam and the received beam is zero or nearly zero. A monostatic implementation may significantly reduce alignment concerns, but a bistatic implementation may allow more receive signal to be collected from the returned laser beams, especially when integrated circulators are not used.

In any implementation of FIGS. 7-9, the use of a laser source with a tuning bandwidth substantially larger than the bandwidth B may allow for scanning in one dimension of the LIDAR field of view (FOV) by tuning the wavelength λo of the generated laser beam and passing the generated laser beam through a diffractive element before splitting. This can reduce requirements on the downstream beam steering.

Figure 10:
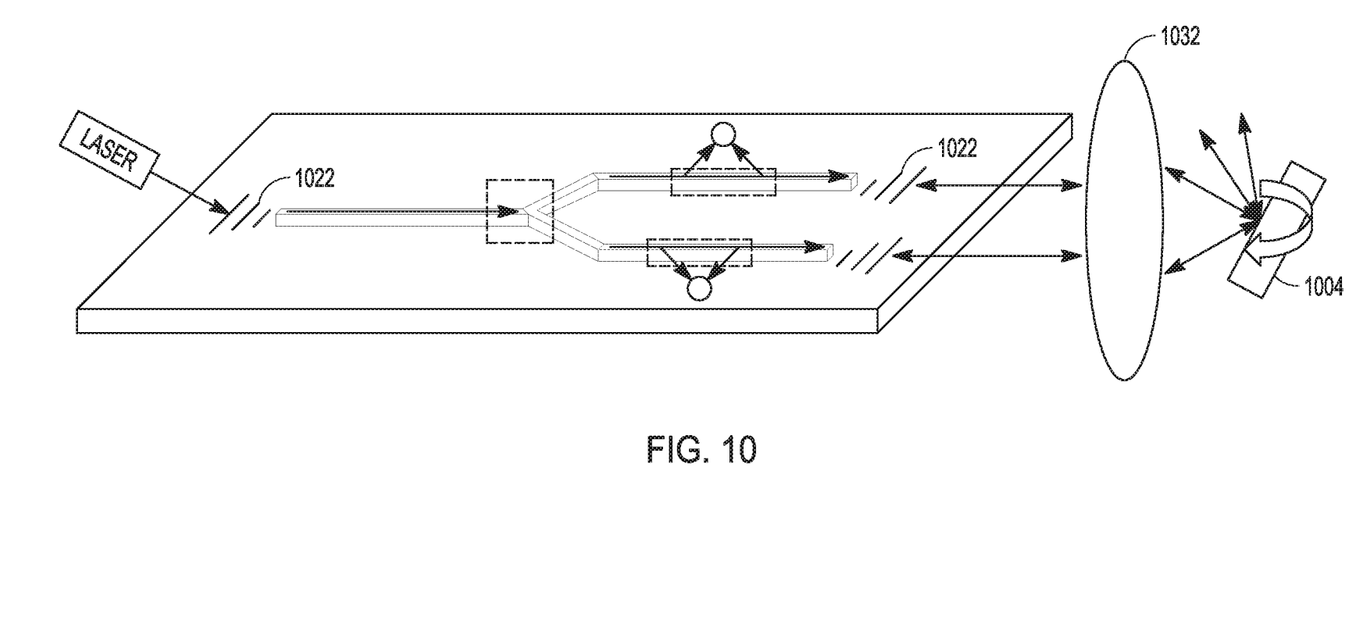
FIG. 10 is a diagram of portions of an example of a beam channel in which multiple beams can be steered together.

FIG. 10 is a diagram of a beam channel included in a PIC (e.g., a PIC as described regarding FIG. 7). The optical element 1022 is a grating coupler and the beam steering element 1004 is a mirror. A lens 1032 focuses the transmit laser beams onto the mirror. The optics are designed to direct the N transmit laser beams at different angles through a single aperture (e.g., the mirror) which can scan them all together. This arrangement allows the N simultaneous transmit laser beams to be distributed angularly in a variety of manners.

Figure 11:
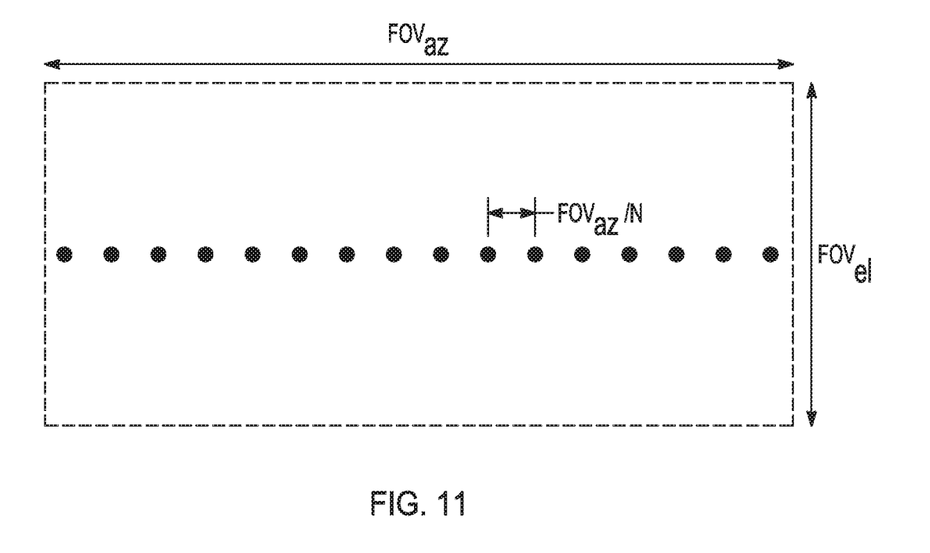
FIG. 11 is an illustration of N transmit laser beams arranged in one dimension as a line.

FIG. 11 is an illustration of the N transmit laser beams split and steered in one dimension as a line of N transmit laser beams spanning the FOV. This allows the beam steering mechanism to distribute the transmit laser beams using a smaller range of angles (e.g., $FOV_{az} \rightarrow FOV_{az}/N$, where $FOV_{az}$ is the scanner field of view in the azimuth direction) than if the beam steering mechanism was steering one transmit laser beam over the whole FOV. The N return beam paths receive N return beams for each of the multiple scan positions. If the number N of transmit laser beams is large enough, a one-dimensional scan line could be generated across the entire FOV, eliminating the need for any beam steering in that dimension.

Figure 12:
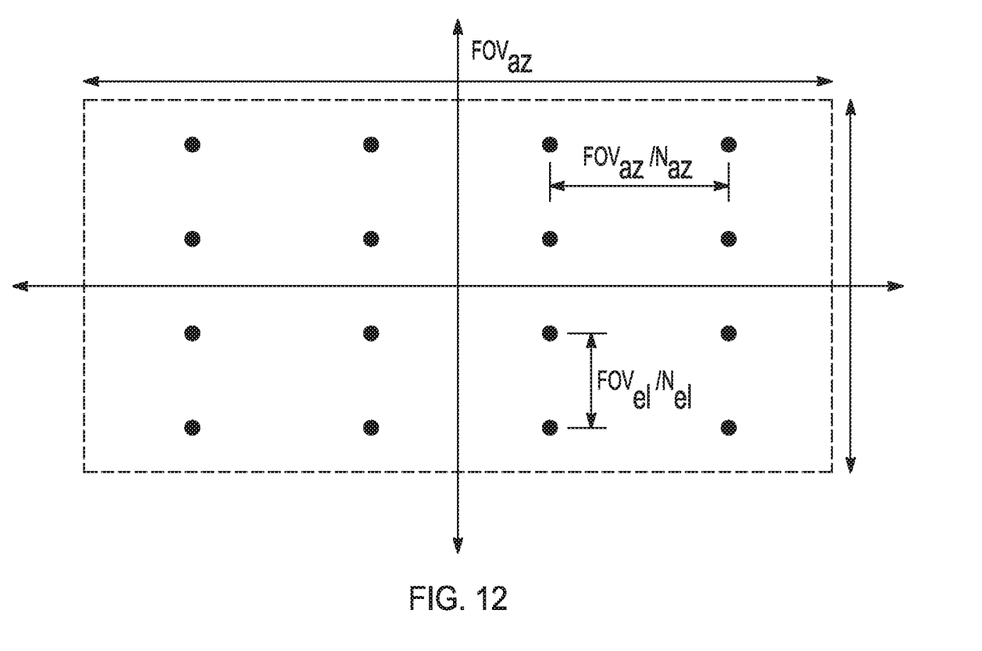
FIGS. 12-13 are illustrations of N transmit laser beams arranged in two dimensions.

FIG. 12 is an illustration of the N transmit laser beams split and steered in two dimensions. The N transmit laser beams are arranged as a two-dimensional (2D) grid of N laser beams. In FIG. 12, the N transmit laser beams are distributed in a 2D grid spanning the FOV allowing the beam steering to scan this grid of imaging points over a smaller range of angles (e.g., $FOV_{az} \rightarrow FOV_{az}/N_{az}$ and $FOV_{el} \rightarrow FOV_{el}/N_{el}$, with $N_{az}*N_{el}=N$ and $FOV_{el}$ is the field of view elevation direction) than if one transmit laser beam is scanned in the FOV. The return beam paths of the beam channels receive N return beams for each of the multiple scan positions.

Figure 13:
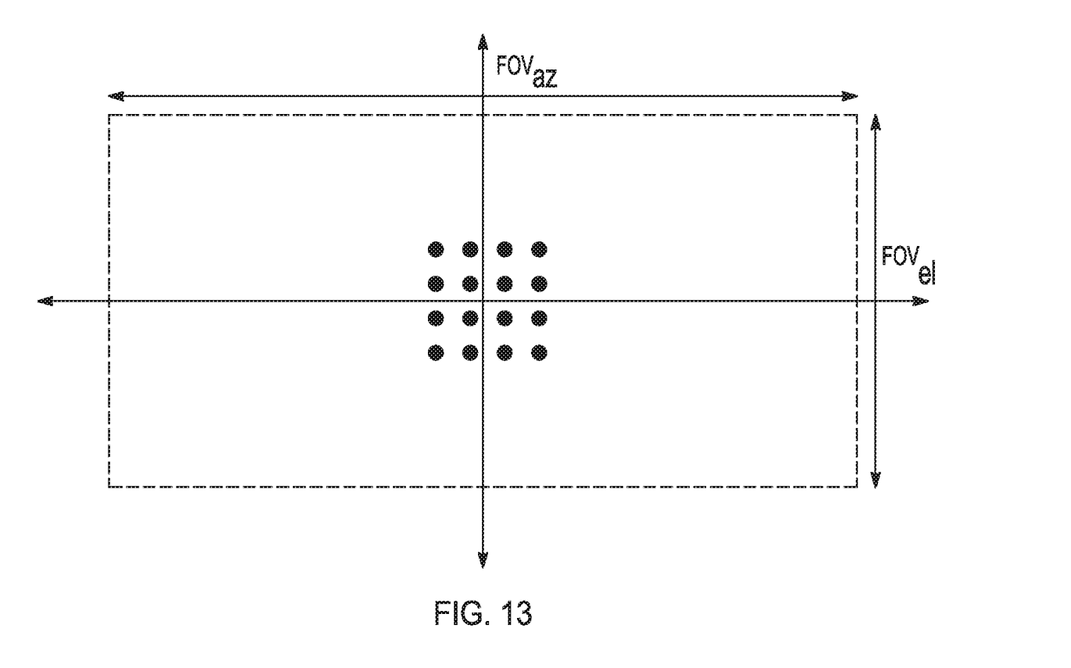

The N transmit laser beams may be more densely arranged than in the examples of FIGS. 11 and 12. FIG. 13 is an illustration of the N transmit laser beams split and steered in two dimensions but with a denser arrangement than in FIG. 12. A denser arrangement in either one-dimension or two-dimensions may be more appropriate for use with a large angle discrete scanner (e.g., a polarization grating).

These examples in FIGS. 11-13 can reduce the range of angles Δθ steered to by the beam steering element, and hence reduces the number of positions or "spots"

$$(N_{spots} \propto \frac{\Delta\theta}{\delta\theta})$$

with beam divergence δθ) required of the beam steering element in one or more dimensions. Resolution can be increased by increasing Δθ or by increasing the beam waist (and size of the beam steering aperture), which reduces divergence δθ. However, both of these approaches are generally challenging to implement. Also, passive optics (e.g., telescopic designs) can be used with a beam steering element to increase δθ (while also increasing δθ) or to decrease δθ (while also decreasing δθ), but they cannot increase the resolution. Alternatively, the reduction in δθ afforded by the multiplexing of the transmit laser beams could be used with a given resolution beam steering element to increase the aperture size, and hence improve the SNR.

By splitting the power of a single generated laser beam into N transmit beams, but increasing the frequency chirp period T from $T=(\tau_{TOF}+\tau_{meas})$ to $\tau_{new}=(\tau_{TOF}+N*\tau_{meas})$, or stated another way $\tau_{meas,new}=N*\tau_{meas}$, the SNR will be unchanged $$SNR = \frac{\gamma(P_t/N)D^2(N\tau_{meas})}{hf_0R^2} = \frac{\gamma P_t D^2 \tau_{meas}}{hf_0R^2}$$

but the time to measure the N imaging points will be reduced so that the frame rate can be increased. The total time t used for scanning the N points in a serially scanned system is $$t=N*(\tau_{meas}+\tau_{TOF}),$$

and the time used for scanning the N points in the laser beam splitting system is $$t=\tau_{TOF}+N*\tau_{meas}.$$

The frame rate improves as $$\frac{N*(\tau_{TOF}+\tau_{meas})}{\tau_{TOF}+N*\tau_{meas}} \approx \frac{\tau_{TOF}+\tau_{meas}}{\tau_{meas}}$$

in the limit of a large value of N. It should be noted that the benefit to frame rate improves as $\tau_{meas}$ decreases. Therefore, the splitting and parallelizing approach works well with the approaches to improve SNR by increasing power and aperture size.

Alternatively, power from the single generated laser beam can be split into the N transmit beams, but the frequency chirp period T can be increased from $T=(\tau_{TOF}+\tau_{meas})$ to $T_{new}=N*(\tau_{TOF}+\tau_{meas})$, or stated another way $\tau_{meas,new}=N*\tau_{meas}+(N-1)*\tau_{TOF}$, the frame rate will be unchanged, but the effective measurement time (and hence the SNR) will increase:

$$SNR = \frac{\gamma(P_t/N)D^2(N*\tau_{meas}+(N-1)*\tau_{TOF})}{hf_0R^2} = \frac{\gamma P_t D^2 \tau_{meas}}{hf_0R^2} * \frac{\tau_{TOF}+\tau_{meas}}{\tau_{meas}}$$

in the limit of a large value of N. The improvement to SNR in this alternative is the same factor as the improvement to frame rate described previously herein.

Deciding between the tradeoff in improvement of SNR and improvement in frame rate may depend on the LIDAR system design. Because $$\Delta R = \frac{c}{2B} \text{ and } \Delta v_r = \frac{\lambda_0}{2T},$$

the resolution in range R is the same with the increase in frequency chirp period from T to $T_{new}$, but the resolution in relative velocity $v_r$ improves. Because $\Delta R$ is set by chirp bandwidth, system designs seeking high range resolution normally require a high bandwidth signal chain, including a high sampling rate ADC which often bounds the achievable range resolution. By utilizing multiple beams with lower bandwidth signal chains as described herein, range resolution normally associated with much higher performance electronics can be achieved without sacrificing frame rate The devices, systems and methods described herein can improve SNR and frame rate in LIDAR systems, and thereby improve the operating range. This can lead to improved performance of LIDAR systems for applications such as vehicle navigation.

ADDITIONAL DESCRIPTION AND ASPECTS

A first Aspect (Aspect 1) includes subject matter (such as a light detection and ranging (LIDAR) system) comprising a laser diode, a laser diode driver circuit, a laser splitter, and multiple return beam paths. The laser diode driver circuit is configured to generate a laser beam using the laser diode and to frequency chirp the generated laser beam according to a frequency chirp period. The laser splitter is configured to split the generated laser beam into N transmit laser beams pointed at different angles, wherein N is an integer greater than one, and a frequency chirp period of each of the N transmit laser beams is the frequency chirp period of the generated laser beam. The multiple return beam paths are configured to receive N return beams and determine time of flight values for the N return beams in parallel.

In Aspect 2, the subject matter of Aspect 1 optionally includes a laser splitter configured to split the generated laser beam into N transmit laser beams arranged as a two-dimensional grid of N laser beams.

In Aspect 3, the subject matter of Aspect 2 optionally includes a beam steering mechanism configured to steer the two-dimensional grid of N laser beams to multiple scan positions. The multiple return beam paths are configured to receive N return beams for the multiple scan positions.

In Aspect 4, the subject matter of Aspect 1 optionally includes a laser splitter configured to split the generated laser beam into N transmit laser beams in one dimension as a line of N transmit laser beams.

In Aspect 5, the subject matter of Aspect 4 optionally includes a beam steering mechanism configured to steer the line of N laser beams to multiple scan positions. The multiple return beam paths are configured to receive N return beams for the multiple scan positions.

In Aspect 6, the subject matter of one or any combination of Aspects 1-5 optionally includes a laser splitter is configured to split the generated laser beam into N beam channels that each include a transmit beam path and a return beam path of the multiple return beams paths. The frequency chirp period of the laser diode driver circuit is specified according to the number N of beam channels.

In Aspect 7, the subject matter of one or any combination of Aspects 1-6 optionally includes a photonic integrated circuit (PIC) having N beam channels configured to receive the N transmit laser beams. Each of the N channels of the PIC includes a return beam path of the multiple return beam paths.

In Aspect 8, the subject matter of one or any combination of Aspects 1-7 optionally includes an optical fiber configured to receive the generated laser beam. The laser splitter includes one or more optical fiber splitters configured to split the generated laser beam received on the optical fiber into N transmit laser beams of N beam channels, and each of the N beam channels includes a photodiode to receive a return beam of the N return beams.

In Aspect 9, the subject matter of one or any combination of Aspects 1-8 optionally includes a laser splitter includes a diffractive optical element configured to split the generated laser beam into the N transmit laser beams a photodiode array, and a lens configured to direct the N return beams onto the photodiode array.

In Aspect 10, the subject matter of one or any combination of Aspects 1-9 optionally includes each return beam path of the multiple return beam paths including a photodiode, transimpedance amplifier, and an analog-to-digital converter (ADC).

In Aspect 11, the subject matter of one or any combination of Aspects 1-10 optionally includes processing circuitry configured to calculate one or both of a range and relative radial velocity for each of the N return beams in parallel.

Aspect 12 includes subject matter (such as a method of operating a LIDAR system) or can optionally be combined with one or any combination of Aspects 1-11 to include such subject matter, comprising generating a laser beam and frequency chirping the generated laser beam using a frequency chirp period; splitting the generated laser beam into N transmit laser beams pointed at multiple different angles, wherein N is an integer greater than one, and a chirp period of each of the N transmit laser beams is the frequency chirp period of the generated laser beam; receiving N return beams at the LIDAR system; and determining multiple time of flight values in parallel using the N return beams.

In Aspect 13, the subject matter of Aspect 12 optionally includes splitting the generated laser beam into N transmit laser beams arranged as a two-dimensional grid of N laser beams.

In Aspect 14, the subject matter of Aspect 13 optionally includes beam steering the N transmit laser beams to scan the two-dimensional grid of N laser beams in a field of view and receiving N return beams for multiple scan positions of the two-dimensional grid of N laser beams.

In Aspect 15, the subject matter of Aspect 12 optionally includes splitting the generated laser beam into N transmitted laser beams in one dimension as a line of N laser beams.

In Aspect 16, the subject matter of Aspect 15 optionally includes beam steering the N transmitted laser beams to scan the line of N laser beams in a field of view, and receiving N returned beams for multiple scan positions of the two-dimensional grid of N laser beams.

In Aspect 17, the subject matter of one or any combination of Aspects 12-16 optionally includes splitting the generated laser beam into N channels and determining the frequency chirp period of the generated laser beam according to the number of channels.

In Aspect 18, the subject matter of one or any combination of Aspects 12-17 optionally includes splitting the generated beams into N channels of a photonic integrated circuit (PIC) and receiving a returned beam at an integrated photodiode of each of the N channels of the PIC.

In Aspect 19, the subject matter of one or any combination of Aspects 12-18 optionally includes coupling the generated laser beam to an optical fiber as a fiber-coupled laser beam; splitting the fiber-coupled laser beam into N channels using one or more optical fiber splitters; and receiving a returned beam at a photodiode included in each of the N channels.

In Aspect 20, the subject matter of one or any combination of Aspects 12-19 optionally includes splitting the generated laser beam into the N transmitted laser beams using a diffractive optical element; and applying the N returned beams to a photodiode array of the LIDAR system.

In Aspect 21, the subject matter of one or any combination of Aspects 12-20 optionally includes calculating one or both of a range and relative radial velocity for each of the N return beams in parallel.

Aspect 22 includes subject matter (such as a LIDAR system) or can optionally be combined with one or any combination of Aspects 1-21 to include such subject matter, comprising means for generating a laser beam using the laser diode, means for frequency chirping the generated laser beam according to a frequency chirp period, means for splitting the generated laser beam into N transmit laser beams pointed at different angles wherein N is an integer greater than one, and a frequency chirp period of each of the N transmit laser beams is the frequency chirp period of the generated laser beam, means for receiving N return beams, and means for determining time of flight values for the N return beams in parallel.

These non-limiting Aspects can be combined in any permutation or combination. The above detailed description includes references to the accompanying drawings, which form a part of the detailed description. The drawings show, by way of illustration, specific embodiments in which the invention can be practiced. These embodiments are also referred to herein as "examples" or "aspects." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A light detection and ranging (LIDAR) system, the system comprising:
   a laser diode;
   a laser diode driver circuit configured to generate a laser beam using the laser diode and to frequency chirp the generated laser beam according to a frequency chirp period;
   a laser splitter configured to split the generated laser beam into N transmit laser beams pointed at different angles and transmit at the same time, wherein N is an integer greater than one, and a frequency chirp period of each of the N transmit laser beams is the frequency chirp period of the generated laser beam; and
   multiple return beam paths to receive N return beams and determine time of flight values for the N return beams in parallel.

2. The system of claim 1, wherein the laser splitter is configured to split the generated laser beam into N transmit laser beams arranged as a two-dimensional grid of N laser beams.

3. The system of claim 2, including a beam steering mechanism configured to steer the two-dimensional grid of N laser beams to multiple scan positions; and
   wherein the multiple return beam paths are configured to receive N return beams for the multiple scan positions.

4. The system of claim 1, wherein the laser splitter is configured to split the generated laser beam into N transmit laser beams in one dimension as a line of N transmit laser beams.

5. The system of claim 4, including a beam steering mechanism configured to steer the line of N laser beams to multiple scan positions; and
   wherein the multiple return beam paths are configured to receive N return beams for the multiple scan positions.

6. The system of claim 1,
   wherein the laser splitter is configured to split the generated laser beam into N beam channels that each include a transmit beam path and a return beam path of the multiple return beams paths; and
   wherein the frequency chirp period of the laser diode driver circuit is specified according to the number N of beam channels.

7. The system of claim 1, including:
   a photonic integrated circuit (PIC) having N beam channels configured to receive the N transmit laser beams; and
   wherein each of the N channels of the PIC includes a return beam path of the multiple return beam paths.

8. The system of claim 1, including:
   an optical fiber configured to receive the generated laser beam;

wherein the laser splitter includes one or more optical fiber splitters configured to split the generated laser beam received on the optical fiber into N transmit laser beams of N beam channels; and wherein each of the N beam channels includes a photodiode to receive a return beam of the N return beams.

9. The system of claim 1, wherein the laser splitter includes a diffractive optical element configured to split the generated laser beam into the N transmit laser beams;

a photodiode array; and a lens configured to direct the N return beams onto the photodiode array.

10. The system of claim 1, wherein each return beam path of the multiple return beam paths includes a photodiode, a trans impedance amplifier, and an analog-to-digital converter (ADC).

11. The system of claim 10, including processing circuitry configured to calculate one or both of a range and relative radial velocity for each of the N return beams in parallel.

12. A method of operating a light detection and ranging (LIDAR) system, the method comprising:

generating a laser beam and frequency chirping the generated laser beam using a frequency chirp period;

splitting the generated laser beam into N transmit laser beams pointed at multiple different angles and transmitting the N transmit laser beams at the same time, wherein N is an integer greater than one, and a chirp period of each of the N transmit laser beams is the frequency chirp period of the generated laser beam;

receiving N return beams at the LIDAR system; and determining multiple time of flight values in parallel using the N return beams.

13. The method of claim 12, wherein splitting the generated laser beam includes splitting the generated laser beam into N transmit laser beams arranged as a two-dimensional grid of N laser beams.

14. The method of claim 13, including:

beam steering the N transmit laser beams to scan the two-dimensional grid of N laser beams in a field of view; and wherein receiving N return beams includes receiving N return beams for multiple scan positions of the two-dimensional grid of N laser beams.

15. The method of claim 12, wherein splitting the generated laser beam includes splitting the generated laser beam into N transmitted laser beams in one dimension as a line of N laser beams.

16. The method of claim 15, including:

beam steering the N transmitted laser beams to scan the line of N laser beams in a field of view; and wherein receiving N returned beams includes receiving N returned beams for multiple scan positions of the two-dimensional grid of N laser beams.

17. The method of claim 12, including:

wherein splitting the generated laser beam includes splitting the generated laser beam into N channels; and determining the frequency chirp period of the generated laser beam according to the number of channels.

18. The method of claim 12, wherein splitting the generated laser beam includes splitting the generated beams into N channels of a photonic integrated circuit (PIC); and wherein receiving the N returned beams includes receiving a returned beam at an integrated photodiode of each of the N channels of the PIC.

19. The method of claim 12, wherein generating a laser beam includes coupling the generated laser beam to an optical fiber as a fiber-coupled laser beam;

wherein splitting the generated laser beam includes splitting the fiber-coupled laser beam into N channels using one or more optical fiber splitters; and wherein receiving the N returned beams includes receiving a returned beam at a photodiode included in each of the N channels.

20. The method of claim 12, wherein splitting the generated laser beam includes splitting the generated laser beam into the N transmitted laser beams using a diffractive optical element; and applying the N returned beams to a photodiode array of the LIDAR system.

21. The method of claim 12, including calculating one or both of a range and relative radial velocity for each of the N return beams in parallel.

22. A light detection and ranging (LIDAR) system, the system comprising:

means for generating a laser beam using the laser diode;

means for frequency chirping the generated laser beam according to a frequency chirp period;

means for splitting the generated laser beam into N transmit laser beams pointed at different angles and transmitting the N transmit laser beams at the same time, wherein N is an integer greater than one, and a frequency chirp period of each of the N transmit laser beams is the frequency chirp period of the generated laser beam;

means for receiving N return beams; and means for determining time of flight values for the N return beams in parallel.

* * * * *